United States Patent
Di Marco et al.

(10) Patent No.: US 8,402,112 B2
(45) Date of Patent: *Mar. 19, 2013

(54) INTER-CACHE COMMUNICATION USING HTTP RESOURCE

(75) Inventors: Aniello Scotto Di Marco, Redmond, WA (US); Won Suk Suk, Redmond, WA (US); Daniel Vasquez Lopez, Duvall, WA (US); Jaroslav Dunajsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/006,694

(22) Filed: Jan. 14, 2011

(65) Prior Publication Data

US 2012/0185557 A1 Jul. 19, 2012

(51) Int. Cl.
*G06F 15/16* (2006.01)
(52) U.S. Cl. ........ 709/217; 711/113; 711/117; 711/118; 709/223; 709/203; 709/229; 709/233
(58) Field of Classification Search .......... 709/217–219, 709/203, 229, 233, 223; 711/113, 117, 118; 726/3, 6, 12
See application file for complete search history.

(56) References Cited

U.S. PATENT DOCUMENTS

| | | | |
|---|---|---|---|
| 5,924,116 A * | 7/1999 | Aggarwal et al. | 711/122 |
| 6,427,187 B2 | 7/2002 | Malcolm | |
| 6,490,615 B1 | 12/2002 | Dias et al. | |
| 6,615,317 B2 | 9/2003 | Roseborough et al. | |
| 6,732,237 B1 | 5/2004 | Jacobs | |
| 7,565,423 B1 | 7/2009 | Fredricksen | |
| 7,697,557 B2 | 4/2010 | Segel | |
| 7,730,262 B2 | 6/2010 | Lowery et al. | |
| 7,761,664 B2 | 7/2010 | Gill | |
| 7,904,562 B2 * | 3/2011 | Takase et al. | 709/226 |
| 2004/0167981 A1 | 8/2004 | Douglas | |
| 2004/0172466 A1 | 9/2004 | Douglas | |
| 2004/0254943 A1 | 12/2004 | Malcolm | |
| 2010/0080226 A1 * | 4/2010 | Khalid et al. | 370/392 |

OTHER PUBLICATIONS

Gulwani et al., "WebCaL—A Domain Specfic Language for Web Caching," 2000, http://research.microsoft.com/en-us/um/people/sumitg/pubs/webcal_wcw00.pdf.
Lindemann, "Evaluating Cooperative Web Caching Protocols for Emerging Network Technologies," University of Dortmund, Department of Computer Science, Aug. 2001.
Andrey Naumenko, "Some Recommendations on Building Proxy caching Service", Pub date: Nov. 1998 (6 pages).
Duane Wessels et al., "ICP and the Squid Web Cache", Pub date : Aug. 13, 1997 (25 pages).
Nikolaos Laoutaris, et al., "The Cache Inference Problem and its Application to Content and Request Routing", Pub. Date: May 29, 2007 (10 pages).

* cited by examiner

*Primary Examiner* — Eleni Shiferaw
*Assistant Examiner* — Gregory M Elmore
(74) *Attorney, Agent, or Firm* — Workman Nydegger (57) ABSTRACT

Servicing resource requests. A method includes at a first caching node, receiving a request for a first resource. The method further includes at the first caching node, determining at least one of health or load information of the first caching node. The method further includes generating a response to the request for the first resource, including generating a header to the response. The header is a custom header. The custom header includes at least one of health or load information. The method further includes sending the response to the request including sending the custom header with the at least one of health or load information.

17 Claims, 5 Drawing Sheets

INTER-CACHE COMMUNICATION USING HTTP RESOURCE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

To access a service on the internet, a user at a client machine will typically type a domain name into an address input of a user interface such as a browser. This domain name can be converted to an IP address at a domain name service (DNS), which can then be used to access the service on the internet.

Often, users may attempt to access a service that is physically located a great distance from the use's client machine. For example, a user in Japan may attempt to access a service in the United States. Generally, this presents no real difficulties so long as the amount of data being provided by the service is minimal, such as a minimal amount of text. Only a small amount of data must travel the long distance from the United States to Japan. However, when larger amounts of data, such as large text files, pictures, videos, audio recordings, and the like are requested, this can contribute to worldwide network congestion. In particular, a single set of data may occupy network bandwidth on multiple networks between the client and the service, where the greater the distance between the client and the service, the more network resources are likely to be required. Additionally, even for smaller amounts of data there are network latency problems. Simply the fact that data travels a large distance across a network results in higher latency of data transmission.

To mitigate this congestion and latency, services will often implement a distributed caching system. In particular a service may have a cache located in closer geographical proximity to a client than the actual service. For example, a client in Osaka, Japan may access data from a cache in Tokyo, Japan for a service in the United States. Other data caches for the same service in the United States may be located at other geographical locations to allow clients to obtain cached data from the service from a cache in closer proximity to the client than the service.

Caching systems may also be organized in an hierarchical fashion. For example, caches may have an hierarchy where caches higher in the hierarchy cover larger geographical regions or more networks than caches lower in the hierarchy. For example, at a first tier is the service or origin located in Redmond, Wash. which provides the service for the entire world. At a second tier is a cache in Singapore that caches data for clients and lower level caches in Asia. At a third tier is a cache in Tokyo, Japan which caches data for clients and lower level caches in all of Japan. At a fourth tier is a cache in Osaka, Japan that caches data for clients in Osaka itself.

Cache hierarchy is designed with an assumption that only a subset of requests are routed to the next tier, meaning each tier is being served as a "filter". For example, consider a 3 tier topology, with a child cache server tier, a parent cache server tier and an origin server. In this example, the child cache server tier will receive 100% of the end-user traffic, while the parent cache server tier will receive something less than 100% (say for example 30%, meaning there was 70% cache hit or 70% of the requested resources have already been cached and will therefore be served directly from the child cache server tier), and the origin server will receive even less, say for example 10%. Based on this assumption, the scale and the capacity planning of a cache hierarchy is done accordingly.

However, this assumption can be wrong, and in particular can be affected by acute conditions. For example, consider the case when news of celebrity death first begins to spread. This results in many users requesting the same information from a news server at the same time. This results in many fresh content (i.e. not cached) requests by a large number of clients. In such event, the content has not been cached by the child servers or parent servers. In the example above, the parent may receive 90% of the traffic (not 30%) and the origin server may receive 70% of the traffic (not 10%). In this case, there is a cascading effect of cache-miss requests that may eventually overload the cache hierarchy.

Another example could involve an unexpected degradation in service, such as network and/or hardware failure where the level of service (as indicated with the health of the system) is sub-optimal. Thus, as opposed to the increase in demand, there is a decrease in performance/availability/reliability that negatively impacts the overall "health". Still other scenarios, though not illustrated specifically here, may occur.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method practiced in a computing environment including a distributed caching topology. The method includes acts for servicing resource requests. The method includes at a first caching node, receiving a request for a first resource. The method further includes at the first caching node, determining at least one of health or load information of the first caching node. The method further includes generating a response to the request for the first resource, including generating a header to the response. The header is a custom header. The custom header includes at least one of health or load information. The method further includes sending the response to the request including sending the custom header with the at least one of health or load information.

Another embodiment described herein is directed to a method practiced in a computing environment including a distributed caching topology. The method includes acts for servicing resource requests. The method includes at a first caching node, receiving a request from a user for a first resource. The method further includes checking a local cache at the first caching node for the resource and determining that the resource is not available at the local cache of the first caching node. The method further includes as a result, checking information about the health of a second caching node and based on the health information of the second caching node determining whether to request the resource from the second caching node or a different caching node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein may be able to prevent a flood of cache-miss requests that overwhelms a system by leveraging response headers between caches or caches and origin servers to include health and performance information so that the "previous" tier servers can make alternate decisions rather than simply forwarding the cache-miss requests to the "next" tier servers.

Embodiments may include the ability to inject health and performance information in custom headers from "next" (i.e. parent) tier cache servers to "previous" (i.e. child) tier cache servers. Embodiments may include the ability for the "previous" tier servers to make alternate/intelligent decisions based on the information included in the custom headers. Embodiments may include the ability for the "previous" tier servers to remove the custom headers before sending the responses to a client.

Figure 1A:
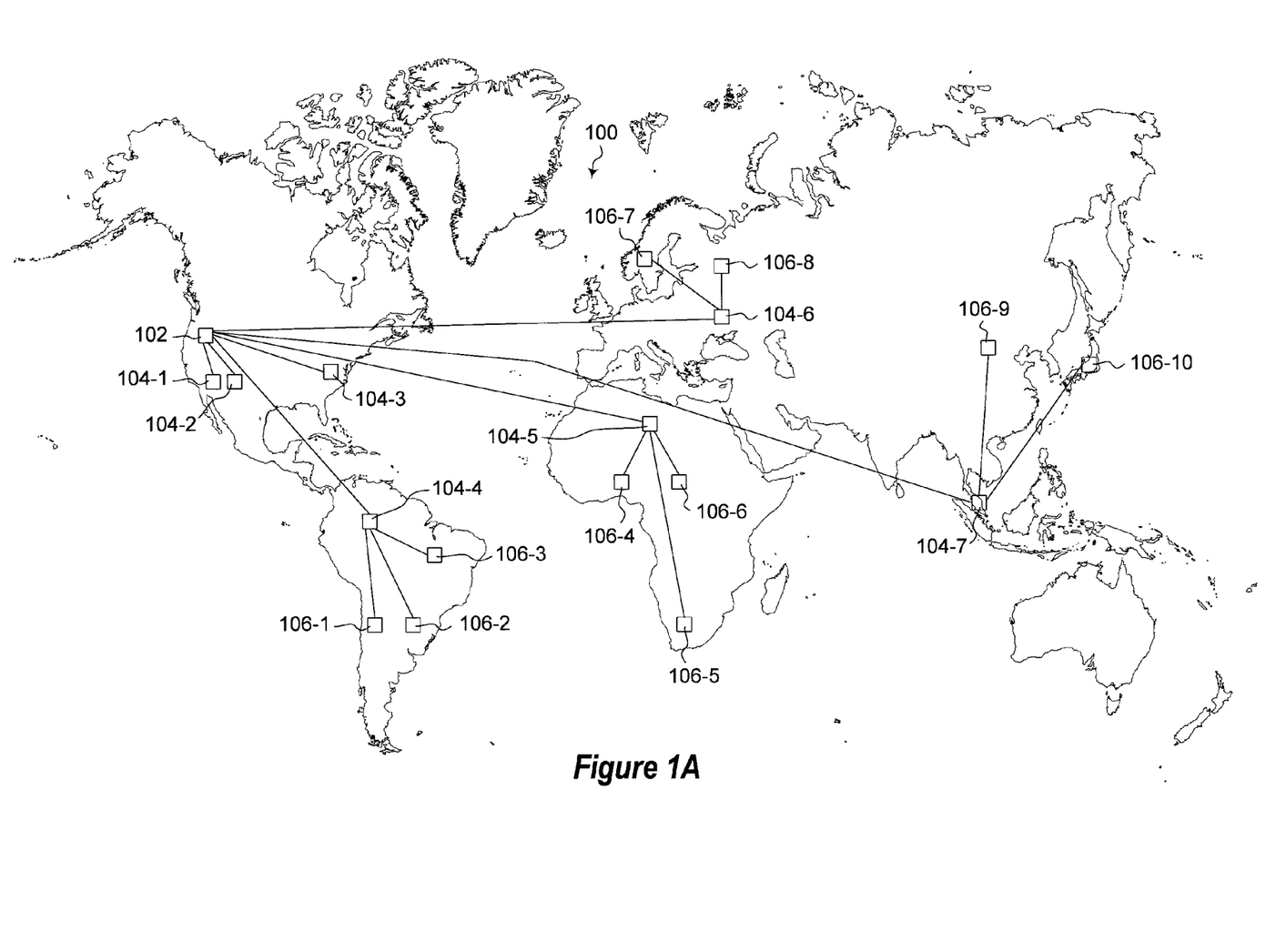
FIG. 1A illustrates a globally distributed cache hierarchy.

Referring now to FIG. 1A, an example cache hierarchy 100 is illustrated. In the example illustrated in FIG. 1A, the hierarchy 100 is based on geographical location and serves to establish caches at various geographic locations. In the example illustrated, an origin server 102 is illustrated in Redmond Wash. In a distributed caching system a cache server with content in the origin server 102 is located in closer proximity to a client than the actual origin server 102. For example, a client in Osaka, Japan may access data from a cache in Tokyo, Japan for a service in the United States. Other data caches for the same origin server 102 in the United States may be located at other geographical locations to allow clients to obtain cached data from the origin server 102 from a cache in closer proximity to the client than the service.

Below the origin server are a number of second tier cache servers, 104-1, 104-2, 104-3, 104-4, 104-5, 104-6, and 104-7 (second tier servers may be referred to herein generically as 104) located at various geographical locations throughout the world. Further still, a number of third tier cache servers, 106-1, 106-2, 106-3, 106-4, 106-5, 106-6, 106-7, 106-8, 106-9, and 106-10 (third tier servers may be referred to herein generically as 106) below the second tier cache servers 104 are located at still other geographical locations. The third tier cache servers 106 may subdivide a geographical region. For example, cache server 104-7 may be a cache server located in Singapore, but that is intended to serve all or large parts of Asia, while cache servers 106-9 and 106-10 each serve smaller portions of Asia.

However, it should be noted, that for load balancing purposes, different cache servers may serve areas outside of their principle responsibilities. Further, it should be noted that cache servers may be organized in a fashion other than one that is strictly, or even primarily geographic. A cache server hierarchy may be based on network traffic, network connection types, network speed, or any of various other factors.

Figure 1B:
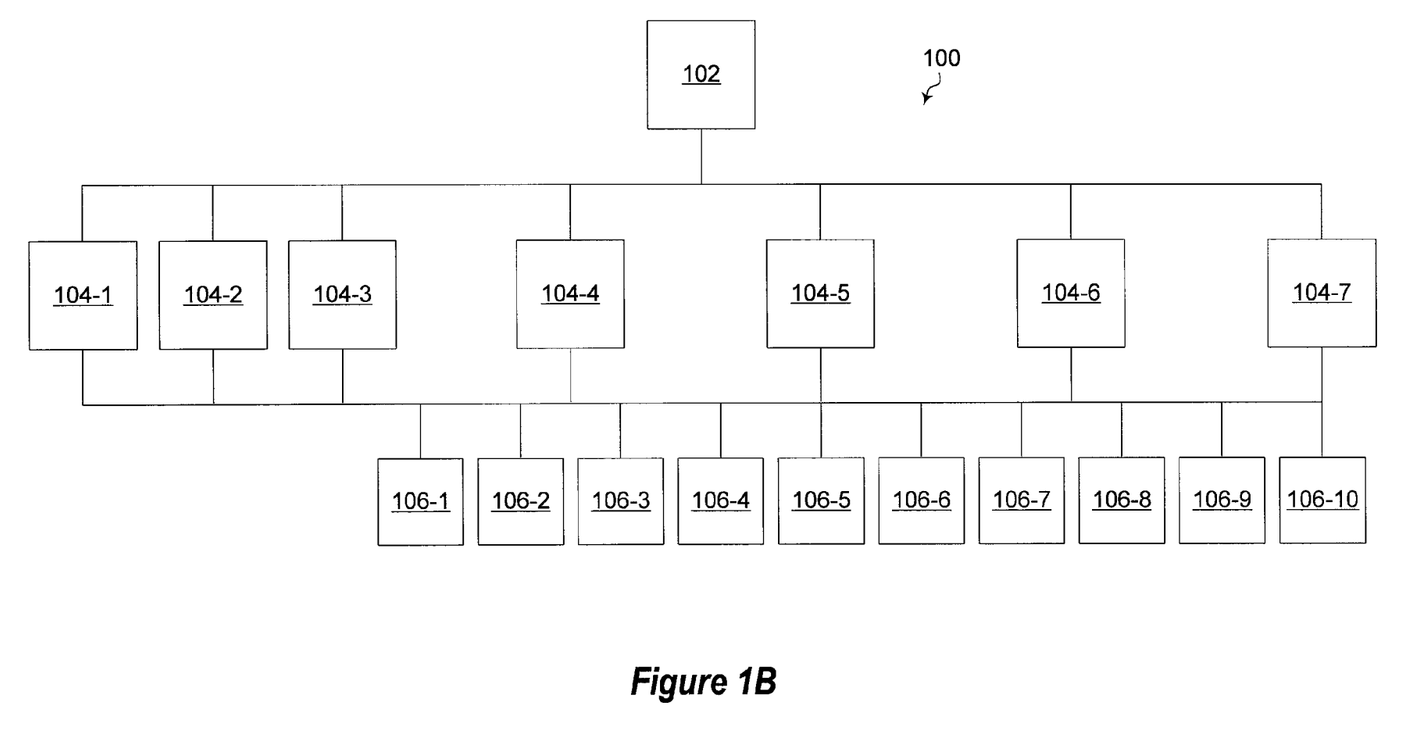
FIG. 1B illustrates a simple hierarchical view of the cache hierarchy.

Further still, it should be noted that in a cache server hierarchy, each lower level (or child) cache server is not necessarily dependant on a particular higher level (or parent) cache server. Thus, for example, while cache server 106-10 might typically contact cache server 104-7 when a cache miss occurs at cache server 106-10, it can contact other cache servers or the origin server 102. For convenience, FIG. 1B illustrates a more traditional hierarchical view of the hierarchy 100 which illustrates some interconnections allowing lower level cache servers to contact various higher level cache servers.

Embodiments may be implemented where cache servers are proxy based. In particular, a cache server will act as a proxy for a system below it. For example, cache server 106-10 will act as a proxy for a client machine to the cache server 104-7, which will act as a proxy for the cache server 106-10 and the client to the origin server 102. As such, both the requests for content or services and responses to the requests flow through the proxy. Given this traffic pattern, when a parent cache server introduces a custom header that includes server health and performance information about the parent cache server, the custom header can be used by a child cache server to make alternate, more intelligent, routing decisions to avoid overwhelming the parent cache server.

For example, a client may request content or services from the cache server 106-10. The request may be a request that requests content or services not available at the cache server 106-10, but which are available from the origin server 102. Thus, the request to the cache server 106-10 results in a cache miss. The cache server 106-10 may then act as a proxy for the client to the next level cache server, such as cache server 104-7.

The cache server 104-7 may have health and/or load issues which mean that the cache server 104-7 may not be an appropriate cache server choice. Similarly, the cache server 104-7 may have health and/or load issues that, in fact, make it a very appropriate cache server for higher level requests. In replying to the cache server 106-10, the cache server 104-7 may include a custom header that indicates various conditions about the cache server 104-7 to the cache server 106-10. The cache server 106-10 can then use this information to make intelligent decisions as to what higher level cache server to forward future requests.

In some embodiments, the cache server 104-7 may have health or load issues that prevent it from responding to a request from the cache server 106-10. The reply from the cache server 104-7 to the cache server 106-10 may reject a request, where the rejection includes an indication of load or health information in the response headers of the rejection.

Cache servers may also include the ability to rewrite response headers. For example, a child cache server (e.g. cache server 106-10) can remove the custom header that the parent cache server (e.g. cache server 104-7) has introduced before forwarding the response to the client. This can be used, for example, to eliminate any end-user impact caused by the custom header information. This can be used to eliminate traces that such communication is taking place between the child and the parent cache servers. This may be desirable to prevent knowledge about the topology of the network to be discovered, for hackers or other attackers to be able to identify weak links in a cache server network fabric. In some embodiments, health and load information may be encrypted in the header such that nefarious entities are not able to obtain the information.

However, it should be noted, that in some embodiments it may be useful to allow the response header, including the health and/or load information to be forwarded to a client machine. The client machine may include functionality for determining appropriate cache servers in the first instance.

Illustrating now further details, in content distribution and caching, the performance, scalability and responsiveness are often affected by several factors. Such factors may include one or more of memory utilization on the cache server; CPU utilization on the cache server; network utilization on the cache server; disk i/o queue length on the cache server; HTTP queue length on the cache server; number of files on disk on the cache server; number of file handles open in memory on the cache server, etc.

Information about these factors, which include health and load factors, may be available by using performance counters on servers. By including information about health and/or load, as well as a possible recommendations in a custom header, the parent cache server can inform a child cache server how to make better routing decisions so that it does not overwhelm an entire cache hierarchy 100 environment.

The following illustrates a custom header including health and load information. In the present example, for ease of illustration, the health and load information is underlined for convenience of the reader.

---

HTTP/1.1 302 Found
Proxy-Connection: Keep-Alive
Connection: Keep-Alive
Content-Length: 0
Expires: Fri, 03 Sep 2010 22:49:48 GMT
Date: Fri, 03 Sep 2010 22:49:48 GMT
Location: http://i.test.com/images/1.gif
Content-Type: image/gif
Server: IIS-ARR/2.1
ARR-health: CPU=80;network=90;disk-queue=30;http-queue=10
Cache-control: max-age = 3600

---

With this information received from the parent cache server, the child cache server may decide that the disk queue length of 30 on the parent cache server is too high. And therefore, for the next 10 requests, it will route to another cache server in the cache hierarchy 100 topology rather than sending additional requests to the same parent cache server, which may overload the parent cache server, and eventually the entire cache hierarchy 100 environment. Thus, in this example a predetermined number of requests may be routed to a different cache server.

In addition, the child cache server has the capability to remove this custom header before sending it back to the client, so that the client is unaware of any inter-cache communications that may take place between the cache servers in the cache hierarchy topology.

Figure 2:
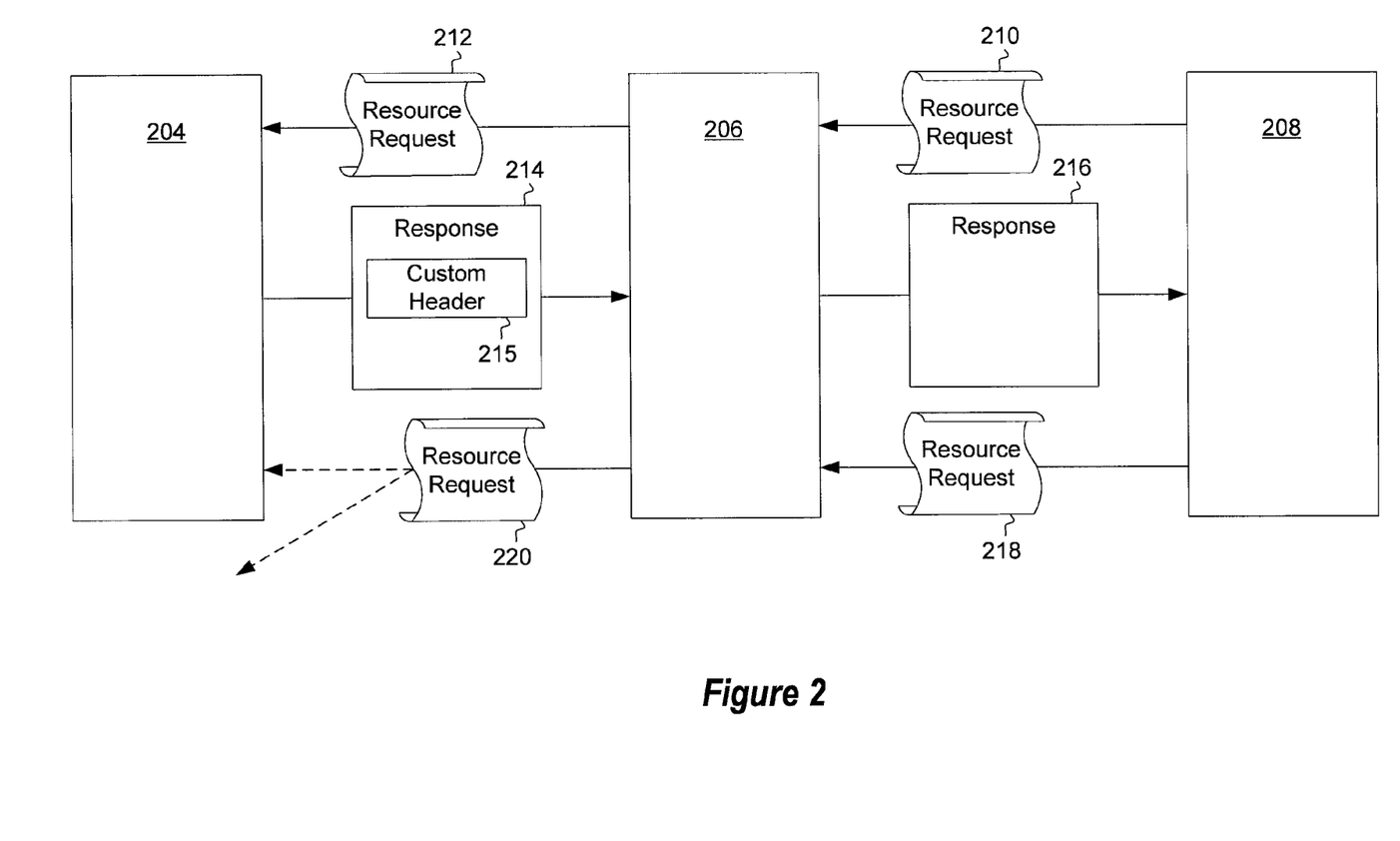
FIG. 2 illustrates communications between a higher level caching server, a lower level caching server, and a client.

Details are now further illustrated with reference to FIG. 2. FIG. 2 illustrates a higher level cache server 204 and a lower level cache server 206 in a cache hierarchy. The lower level cache server 206 is connected, such as through a network or other appropriate connection, to a client 208.

The client 208 sends a resource request 210 to the lower level cache server 206 requesting some resource, such as a file, web page, style sheet, image, etc. The lower level cache server 206 experiences a cache miss, meaning that it does not have in local storage, one or more of the resources requested in the resource request 210. As a result, the lower level cache server 206 sends its own resource request 212 to the higher level cache server 204. The resource request 212 in some embodiments may be very similar or nearly identical to the resource request 210 except with some changes to routing information in the header.

The higher level cache server 204 may have the resources originally requested by the client 208 and therefore returns a response 214. The response 214 may include the requested resources, an error message, or other appropriate response. The response 214 further includes a custom header 215. The custom header 215 may include various header information as is illustrated in the sample header above. Further, as illustrated above, the custom header 215 includes at least one of health or load information about the higher level cache server 204. Notably, if the higher level cache server 204 has health or load information for one or more other cache servers, the custom header may include, alternatively or additionally, at least one of health or load information for one or more of the other cache servers.

In another example, a response from a cache server from the higher level cache server 204 may include all or parts of the custom header, which are then simply forwarded with no or little modification to the lower level cache server. For example, the higher level cache server may itself experience a cache miss, and thus may request the originally requested resource from an even higher level cache server, a sibling cache server, or in some embodiments, even a lower level cache server. A cache server responding to a request from the higher level cache server 204 may send a response where the response includes a custom header including at least one of health or load information of the responding cache server (and/or as can be imagined iteratively following the present example, at least one of health or load information of yet another caching server).

However, returning once again to the example explicitly illustrated in FIG. 2, the lower level caching server 206 may send a response 216 to the client 208. The response may include resources, error messages, and the like that were received in the response 214. In fact, the response 216 may be identical or nearly identical to the response 214 except for changes in routing information or other contextual information. In the illustrated example in FIG. 2, the response 216 differs from the response 214 in at least that it does not include the custom header 115 including the health or load information. While the response 216 may include a header, the header may not include the same information as the custom header 215, for security or other reasons.

In a subsequent resource request scenario, the health or load information may be used by the lower level cache server. For example, the client 208 may send a resource request 218. While in this example, the client 208 is illustrated as sending both the resource request 210 and 218, it should be appreciated that different clients could send the different resource requests with similar outcomes. In particular a first client could send the resource request 210 and a different second client could send the resource request 218. The resource request 218 may request one or more resources such as a web page, image, style sheet, script code, etc. from the lower level cache server 206. The lower level cache server 206 may experience a cache miss in that it does not have a resource requested in the resource request 218. Thus, the lower level cache server 206 may need to request resources, using a resource request 220, from another cache server. The lower level cache server 206 can use the health or load information obtained in the custom header 215 to determine if the resource request 220 should be sent to the higher level cache server 204 or to another different cache server. For example, if the health or load information from the custom header 215 indicates that the higher level cache server 204 is healthy and/or not overloaded, the resource request may be sent to the higher level cache server. Otherwise, the resource request may be sent to a different cache server.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
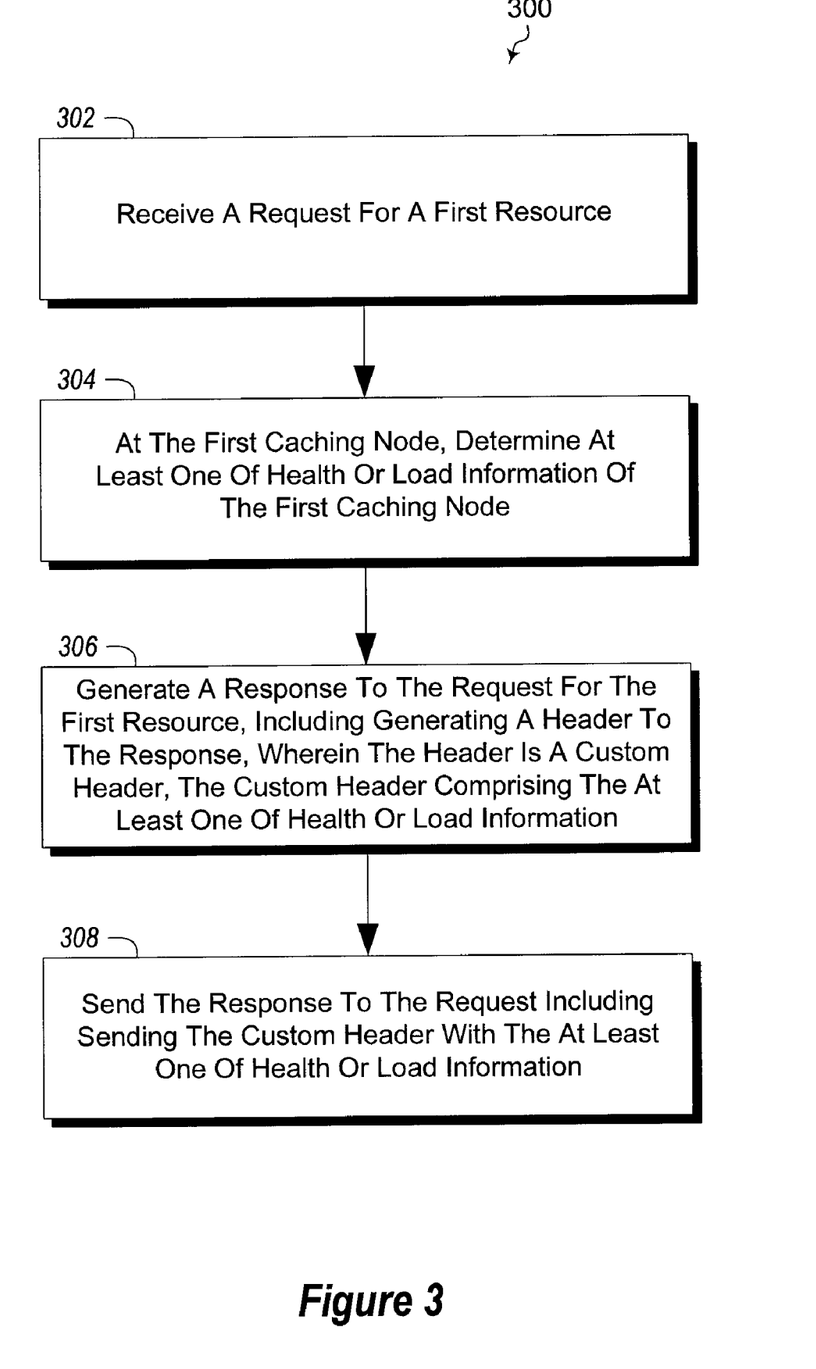
FIG. 3 illustrates a method of servicing resource requests.

Referring now to FIG. 3, a method 300 is illustrated. The method 300 may be practiced in a computing environment including a distributed caching topology. The method 300 includes acts for servicing resource requests. The method 300 includes at a first caching node, receiving a request for a first resource (act 302). For example, a client or other caching server may send a request for one or more resources, such as a web page, image, style sheet, script code, etc.

The method 300 further includes at the first caching node, determining at least one of health or load information of the first caching node (act 304). Such information may include, for example, one or more of memory utilization for the first caching node; CPU utilization for the first caching node; network utilization for the first caching node; disk i/o queue length for the first caching node; HTTP queue length for the first caching node; number of files on disk at the first caching node; or number of file handles open in memory for the first caching node.

The method 300 further includes generating a response to the request for the first resource, including generating a header to the response. The header is a custom header. The custom header includes the at least one of health or load information (act 306). An example custom header is illustrated above.

The method 300 further includes sending the response to the request including sending the custom header with the at least one of health or load information (act 308). For example, a response may be sent to a client or another caching node where the response includes the custom header with health or load information.

The method 300 may be practiced where receiving a request for a first resource includes receiving a request from a child caching node. For example, as illustrated in FIG. 1B, the caching node 104-4 may receive a request from a child caching node 106-2.

In an alternative embodiment, the method 300 may be practiced where receiving a request for a first resource comprises receiving a request from a sibling caching node. For example, the caching node 104-4 may receive a request from the caching node 104-6. Or, the caching node 106-2 may receive a request from the caching node 106-3.

Figure 4:
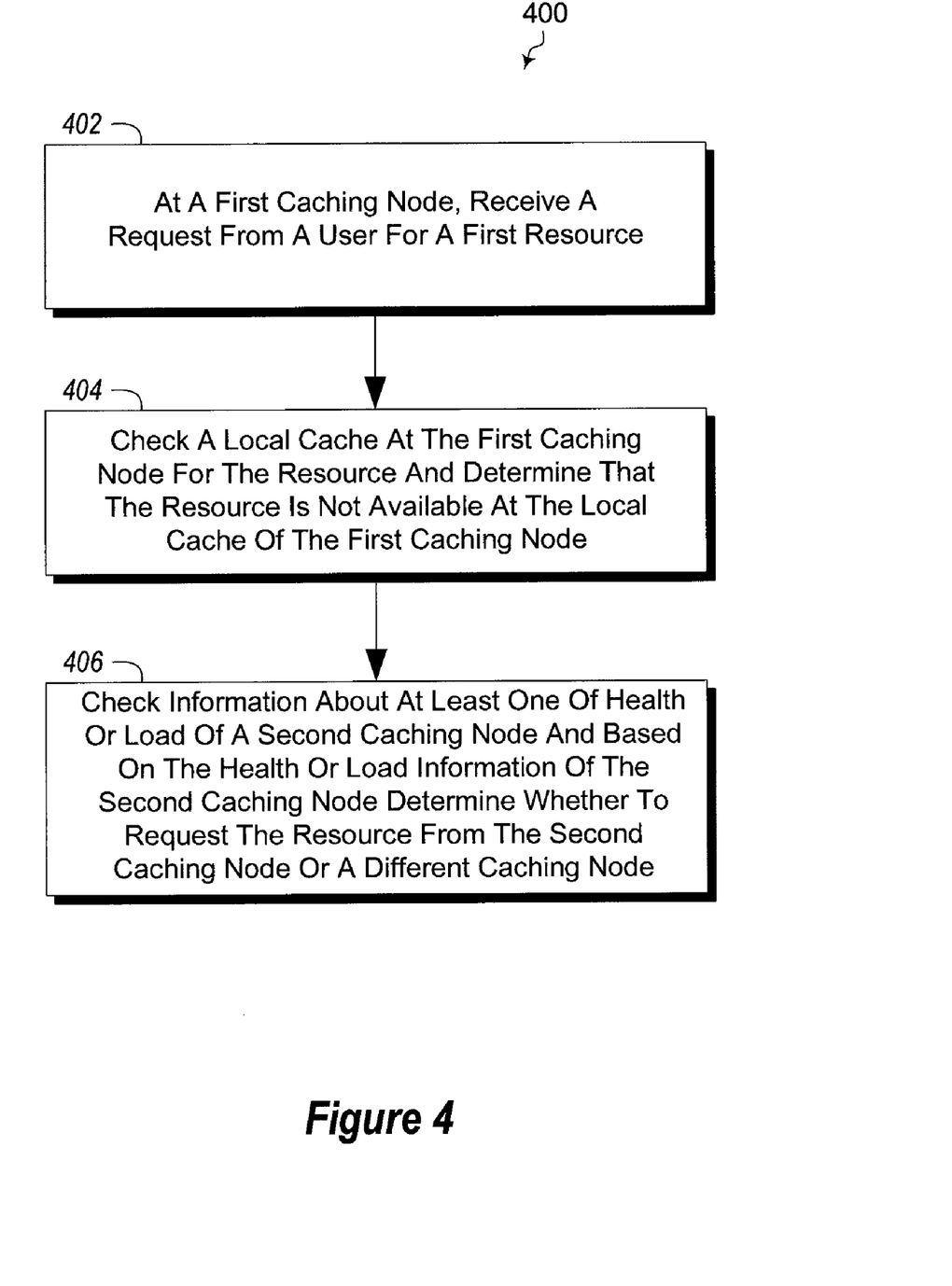
FIG. 4 illustrates another method of servicing resource requests.

Referring now to FIG. 4, a method 400 is illustrated. The method 400 may be practiced in a computing environment including a distributed caching topology. The method 400 includes acts for servicing resource requests. The method includes at a first caching node, receiving a request from a user for a first resource (act 402). For example, a caching node may receive a request from a caching node lower in a cache hierarchy or directly from a user at a client machine.

The method 400 further includes checking a local cache at the first caching node for the resource and determining that the resource is not available at the local cache of the first caching node (act 404).

The method 400 further includes as a result, checking information about at least one of health or load of a second caching node and based on the health or load information of the second caching node determining whether to request the resource from the second caching node or a different caching node (act 406). For example, when the caching node 106-2 determines that it does not have a requested resource available at the caching node 106-2, the caching node 106-2 may check information that it has stored about caching node 104-4 to determine the health or load at caching node 104-4. If the caching node 104-4 appears to be in an unhealthy or overloaded state, then the caching node 106-2 may determine to request a resource from a different caching node than the caching node 104-4. The resource request may be sent to a caching node that is higher in the hierarchy 100 (such as caching node 104-5) or a caching node that is at the same level in the hierarchy, such as a sibling caching node (such as caching node 106-1) or any other appropriate caching node in the hierarchy 100.

The method 400 may be practiced where the second caching node is a parent node of the first caching node. In the example illustrated above, the first caching node may be node 106-2, and the second caching node may be caching node 104-4. Embodiments of the method 400 may be practiced where the second caching node is a sibling to the first caching node. In the example illustrated above, the first caching node may be node 106-2, and the second caching node may be caching node 106-3.

The method 400 may be practiced where determining whether to request the resource from the second caching node or a different caching node includes checking the at least one of the health or load information of a plurality of siblings of the first caching node. For example, the caching node 106-2 may check the health of nodes 106-1 and 106-3.

The method 400 may further include receiving at least one of health or load information from the second caching node. For example, the health or load information that is being checked may be received directly from the node to which it applies. For example, node 104-4 may send health or load information to the node 106-2. In some embodiments, receiving at least one of health or load information from the second caching node includes receiving the at least one of health or load information in a custom response header. Still further, in some embodiments, the at least one of health or load information is received as a result of a request for a different resource than the first resource. For example, as illustrated above, a client or caching node, for example node 106-2, may request a resource from another caching the node, for example node 104-4, as a result of a cache miss. The other caching node 104-4 may send back the resource with the health or load information in a custom header. When the caching node 106-2 experiences another cache miss for a different resource, the caching node 106-2 may consult the health or load information previously received to determine if a request for the different resource should be sent to the caching node 104-4 or some other caching node.

Embodiments may further include removing the at least one of health or load information from the custom response header prior to forwarding a response to the user. For example, as illustrated in FIG. 2, load or health information in the custom header 215 may be stripped out by the lower level cache server 206 before the response 214 is forwarded on to the client 208 as the response 216.

The method 400 may be further practiced to include storing the at least one of health or load information locally for use in subsequent dynamic routing of resource requests. For example, as illustrated in FIG. 2, the lower level cache server 206 may store the health or load information at local storage or in local memory for use in determining how subsequent requests (such as request 218) are handled.

The method 400 may be practiced where at least one of the health or load information includes acute health information indicating an immediate or more short term condition. For example, the health information may indicate the immediate or imminent failure of a hardware component at the caching node.

Alternatively, the method 400 may be practiced where at least one of the health or load information includes chronic health information. For example, the health or load information may indicate a trend of increasing requests, that does not create an immediate problem, but which could gradually create future problems.

Alternatively, the method 400 may be practiced where at least one of the health or load information includes future health information. For example, the health information may indicate that a caching node will be shut down for maintenance at a given time. Health information could identify planned tasks that could impact the health such as anti-virus and/or anti-spam scanning operation, disk de-fragmentation tasks, etc.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the inven-

What is claimed is:

1. In a computing environment comprising a hierarchy of caching nodes which together form a distributed caching topology, a method of servicing resource requests from a user at a client system, the method comprising:
- at a first caching node, receiving a request from a user at a client system for a first resource;
- checking a local cache at the first caching node for the first resource and determining that the first resource is not available at the local cache of the first caching node;
- the first caching node then serving as a proxy for the client system and forwarding the user request to a second caching node in the hierarchy;
- receiving at the first caching node a reply from the second caching node that includes as part of the reply an indication of whether the requested first resource is available at the second caching node, and also a header that includes information indicating (i) overall health of the second caching node as represented by performance, availability or reliability, and (ii) current load at the second caching node;
- storing at the first caching node the header information; and
- thereafter, when receiving at the first caching node any further request for other resources which the first caching node is not able to provide, the first caching node using the stored header information to check at least one of health or load of the second caching node and based on the stored header information determining whether to request the other resource from the second caching node or a different caching node.

2. The method of claim 1, wherein the second caching node is a parent node of the first caching node.

3. The method of claim 1, wherein the second caching node is a sibling to the first caching node.

4. The method of claim 1, further comprising storing at the first caching node header information for a plurality of caching nodes in the hierarchy, and wherein determining whether to request the resource from the second caching node or a different caching node comprises checking the stored header information for a plurality of siblings of the first caching node in the hierarchy.

5. The method of claim 1 wherein the method is performed by executable instructions stored on physical computer readable storage device.

6. The method of claim of claim 1 further comprising removing the header information from the reply from the second caching node prior to forwarding the reply to the user.

7. The method of claim 1, wherein the at least one of health or load information comprises acute health or load information.

8. The method of claim 1, wherein the at least one of health or load information comprises chronic health or load information.

9. The method of claim 1, wherein the at least one of health or load information comprises future health or load information.

10. In a computing environment comprising a hierarchy of caching nodes which together form a distributed caching topology, a method of servicing resource requests from a user at a client system, the method comprising:
- at a first caching node that is part of a hierarchy of caching nodes, receiving from a second caching node that is either at or below the level of the first caching node in the hierarchy a request for a first resource from a user at a client system;
- at the first caching node, generating a response to the request for the first resource that includes an indication of whether the requested resource is available at the first caching node, and generating a custom header to the response that includes information indicating (i) overall health of the first caching node as represented by performance, availability or reliability, and (ii) current load at the first caching node; and
- sending the response to the request including sending the custom header back to the second caching node so that the information in the custom header is available for use by the second caching node when processing subsequent requests for resources.

11. The method of claim 10, wherein the custom header information includes at least one of memory utilization for the first caching node; CPU utilization for the first caching node; network utilization for the first caching node; disk I/O queue length for the first caching node; HTTP queue length for the first caching node; number of files on disk at the first caching node; or number of file handles open in memory for the first caching node.

12. The method of claim 10, wherein the method is performed by executable instructions stored on physical computer readable storage device.

13. In a computing environment comprising a hierarchy of caching nodes which together form a distributed caching topology, a method of servicing resource requests from a user at a client system, the method comprising:
- at a first caching node, receiving from a client a first request for a first resource;
- at the first caching node, determining that the first caching node does not have the first resource cached at the first caching node;
- as a result, the first caching node then serving as a proxy for the client system and forwarding the client request to a second caching node in the hierarchy;
- at the first caching node, receiving from the second caching node a response to the forwarded request for the first resource, the response including an indication of whether the requested resource is available at the second caching node, and the response also including a header that includes information indicating (i) overall health of the second caching node as represented by performance, availability or reliability, and (ii) current load at the second caching node;
- storing the header information at the first caching node;
- the first caching node sending at least a portion of the response received from the second caching node to the client, but not sending the header information;
- at the first caching node receiving from a client a request for a second resource;
- at the first caching node, determining that the first caching node does not have the second resource cached at the first caching node; and
- as a result, the first caching node using the stored header information to check at least one of health or load of the second caching node and based on the stored header information determining whether to request the second resource from the second caching node or a different caching node.

14. The method of claim 13, wherein the at least one of health or load information comprises acute health or load information.

15. The method of claim 13, wherein the at least one of health or load information comprises chronic health or load information.

16. The method of claim 13, wherein the at least one of health or load information comprises future health or load information.

17. In a computing environment comprising a hierarchy of caching nodes which together form a distributed caching topology, a computer program product comprising physical computer readable storage device having executable instructions for implementing a method of servicing resource requests from a user at a client system, wherein the method comprises:
- at a first caching node, receiving from a client a first request for a first resource;
- at the first caching node, determining that the first caching node does not have the first resource cached at the first caching node;
- as a result, the first caching node then serving as a proxy for the client system and forwarding the client request to a second caching node in the hierarchy;
- at the first caching node, receiving from the second caching node a response to the forwarded request for the first resource, the response including an indication of whether the requested resource is available at the second caching node, and the response also including a header that includes information indicating (i) overall health of the second caching node as represented by performance, availability or reliability, and (ii) current load at the second caching node;
- storing the header information at the first caching node;
- the first caching node sending at least a portion of the response received from the second caching node to the client, but not sending the header information;
- at the first caching node receiving from a client a request for a second resource;
- at the first caching node, determining that the first caching node does not have the second resource cached at the first caching node; and
- as a result, the first caching node using the stored header information to check at least one of health or load of the second caching node and based on the stored header information determining whether to request the second resource from the second caching node or a different caching node.

* * * * *

UNITED STATES PATENT AND TRADEMARK OFFICE
CERTIFICATE OF CORRECTION

PATENT NO. : 8,402,112 B2  Page 1 of 1
APPLICATION NO. : 13/006694
DATED : March 19, 2013
INVENTOR(S) : Di Marco et al.

It is certified that error appears in the above-identified patent and that said Letters Patent is hereby corrected as shown below:

<u>Title Page:</u>
Item (75), Inventors, change "Won Suk Suk" to --Won Suk Yoo--

Signed and Sealed this
Twenty-second Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,402,112 B2
APPLICATION NO. : 13/006694
DATED : March 19, 2013
INVENTOR(S) : Di Marco et al.

Page 1 of 1

It is certified that error appears in the above-identified patent and that said Letters Patent is hereby corrected as shown below:

In Title page, in item (56), under "Other Publications" column 2, line 1, delete "Specfic" and insert -- Specific --, therefor.

In the Specification
In column 6, line 34, after "as" delete "is".

In the Claims
In column 11, line 50, In Claim 6, after "claim" delete "of claim".

Signed and Sealed this
Twenty-fourth Day of February, 2015

Michelle K. Lee
*Deputy Director of the United States Patent and Trademark Office*